(12) United States Patent
Maeda (10) Patent No.: US 8,901,436 B2
(45) Date of Patent: Dec. 2, 2014

(54) WALL-MOUNT REMOTE CONTROLLER

(75) Inventor: Kazuo Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/240,779

(22) PCT Filed: Dec. 13, 2011

(86) PCT No.: PCT/JP2011/006936
§ 371 (c)(1),
(2), (4) Date: Feb. 25, 2014

(87) PCT Pub. No.: WO2013/088468
PCT Pub. Date: Jun. 20, 2013

(65) Prior Publication Data
US 2014/0217097 A1      Aug. 7, 2014

(51) Int. Cl.
*H02G 3/08*      (2006.01)
*H02G 3/14*      (2006.01)
*G08C 17/00*     (2006.01)
*F24F 11/00*     (2006.01)

(52) U.S. Cl.
CPC .................. *H02G 3/14* (2013.01); *G08C 17/00* (2013.01); *F24F 2011/0068* (2013.01)
USPC ............................. 174/481; 174/561; 361/622

(58) Field of Classification Search
USPC ............................. 174/481, 67, 561; 361/622
See application file for complete search history.

(56) References Cited

U.S. PATENT DOCUMENTS

| | | | | |
|---|---|---|---|---|
| 3,752,900 A | * | 8/1973 | Harrison et al. | 174/562 |
| 3,967,164 A | * | 6/1976 | Valle | 361/628 |
| 4,706,808 A | * | 11/1987 | Guetersloh | 206/305 |
| 4,805,073 A | * | 2/1989 | Johnson et al. | 361/627 |
| 5,621,387 A | * | 4/1997 | Phillips et al. | 220/4.02 |
| 7,396,996 B1 | * | 7/2008 | Shotey et al. | 174/67 |

(Continued)

FOREIGN PATENT DOCUMENTS

| | | |
|---|---|---|
| JP | 2001-112074 A | 4/2001 |
| JP | 2006-183924 A | 7/2006 |
| JP | 2008-135529 A | 6/2008 |
| JP | 2009-216348 A | 9/2009 |

OTHER PUBLICATIONS

International Search Report of the International Searching Authority mailed Jan. 31, 2012 for the corresponding international application No. PCT/JP2011/006936.

*Primary Examiner* — Hung V Ngo
(74) *Attorney, Agent, or Firm* — Posz Law Group, PLC (57) ABSTRACT

The wall-mount remote controller includes a base fixable to a wall W and a cover releasably attached to the base, having a box shape with an open rear, and covering a front surface of the base. The cover includes a bottom surface having an insertion opening therethrough. In a lower front of the base, a spring hook is disposed. The spring hook includes a support extending frontward from the front surface of the base and a hook section extending downward from an end of the support and then extending rearward. A hook protrusion is disposed on a lower surface of an extending rear portion of the hook section. The hook protrusion is engageable with the insertion opening of the cover. The hook protrusion is disengageable from the insertion opening by upward bending of the hook section caused by pressing of the hook protrusion by the tool inserted through the insertion opening.

8 Claims, 5 Drawing Sheets

(56) References Cited

U.S. PATENT DOCUMENTS

| | | | |
|---|---|---|---|
| 7,569,777 B1* | 8/2009 | Gillam | 174/562 |
| 7,589,277 B2* | 9/2009 | Kessler et al. | 174/50 |
| 7,994,438 B2* | 8/2011 | Rogers et al. | 174/542 |
| 8,530,757 B2* | 9/2013 | Dinh | 174/481 |
| 2008/0029428 A1* | 2/2008 | Kolada | 206/701 |
| 2012/0073874 A1* | 3/2012 | Phillips et al. | 174/542 |
| 2013/0341083 A1* | 12/2013 | Binner | 174/541 |

\* cited by examiner

WALL-MOUNT REMOTE CONTROLLER

CROSS REFERENCE TO RELATED APPLICATION

This application is a U.S. national stage application of International Application No. PCT/JP2011/006936 filed on Dec. 13, 2011, the disclosure of which is incorporated by reference.

TECHNICAL FIELD

The present invention relates to a remote controller mountable on a wall and in particular to a structure for detaching a cover of a remote controller.

BACKGROUND ART

An example of a known wall-mount remote controller is one that includes a base mountable on a wall and a cover covering the front portion of the base, the base including a base-side engaging section, the cover including a cover-side engaging section removably engaged with the base-side engaging section, the front surface of the cover including an insertion opening allowing a tool for use in releasing engagement between the base-side engaging section and the cover-side engaging section (see, for example, Patent Literature 1). In the remote controller in Patent Literature 1, the tool is inserted through the insertion opening, the handle side of the tool is moved downward about the insertion opening serving as a fulcrum, the leading end of the tool is moved upward inside the cover using the principle of the lever, and the cover-side engaging section is pressed upward, thus releasing the engagement and detaching the cover.

CITATION LIST

Patent Literature

Patent Literature 1: Japanese Unexamined Patent Application Publication No. 2009-216348 (page 4, page 5, FIG. 1)

SUMMARY OF INVENTION

Technical Problem

In the wall-mount remote controller in Patent Literature 1, because the principle of the lever is used in the method of detaching the cover, the insertion opening (fulcrum of the lever) is pressed by the tool every time the cover is detached. When the cover is detached many times, the insertion opening may be gradually dented and damaged. If the insertion opening is severely dented, it is unable to function as the fulcrum. This raises a problem in that it is difficult to detach the cover.

In addition, because the insertion opening is disposed in the front surface of the cover, that is, in the aesthetic surface, there is a problem in that damage to the insertion opening impairs the aesthetic appearance. Moreover, when the insertion opening is disposed in the front surface of the cover, something may be unintentionally inserted into the insertion opening, and this may impair the aesthetic appearance or cause the cover to come off.

One approach to addressing these issues is to dispose the insertion opening in the bottom surface of the cover. If the insertion opening is simply positioned in the bottom surface of the cover and the detaching method is still assumed to use the principle of the lever, a user would grip the handle of a tool, insert the leading end of the tool through the insertion opening, and move the handle toward the wall about the insertion opening serving as a fulcrum. In that case, the range where the handle of the tool can be operated is restricted by the wall, and this raises a problem in that it is difficult to detach the cover.

The remote controller in Patent Literature 1 has a structure in which the engagement portion between the base-side engaging section and the cover-side engaging section acts as a protective wall for preventing a tool from being excessively inserted into the remote controller. Conversely, only the engaging portion acts as the protective wall, and if the engagement of that engagement portion is released, the tool becomes able to be inserted into the remote controller. Accordingly, there is a problem in that if the tool is unintentionally pushed in the insertion direction strongly in releasing the engagement, the tool may enter the inside of the remote controller and break a component, such as a circuit board, inside the cover.

In the first place, a method of detaching a cover using the principle of the lever requires two operations consisting of an operation of placing an inserted tool on an insertion opening and a leverage operation of rotating the handle of the tool about the insertion opening (lowering the handle) serving as a fulcrum while keeping the tool on the insertion opening, from inserting the tool into the insertion opening acting as a fulcrum to releasing engagement to pulling out the tool. That is, it is necessary to pay attention to these two operations, and this leads to a low operation efficiency problem. The method using the principle of the lever also has a problem in that if excessive force is applied in detaching the cover, the cover may be come off, fall to the floor, and be broken.

In light of these circumstances, it is an object of the present invention to provide a wall-mount remote controller that allows a cover to be readily detached without impairing the aesthetic appearance or breaking inside components by a method that does not use the principle of the lever.

Solution to Problem

A wall-mount remote controller according to the present invention includes a base fixable to a wall and a cover releasably attached to the base, having a box shape with an open rear, and covering a front surface of the base. The cover includes a bottom surface having an insertion opening therethrough. The insertion opening allows a pressing member to be inserted therein in detaching the cover from the base. In a lower front portion of the base, a spring hook is disposed. The spring hook includes a support extending frontward from the front surface of the base and a hook section extending downward from an end of the support and then extending rearward. A hook protrusion is disposed on a lower surface of an extending rear portion of the hook section. The hook protrusion is engageable with the insertion opening of the cover. The hook protrusion is disengageable from the insertion opening by upward bending of the hook section caused by pressing of the hook protrusion by the pressing member inserted through the insertion opening.

Advantageous Effects of Invention

According to the present invention, engagement between the hook protrusion and the insertion opening can be released simply by insertion of the pressing member through the insertion opening in the bottom surface of the cover and pressing of the hook protrusion, thus detaching the cover from the base. The cover can be detached simply by an operation of inserting the pressing member and an operation of pulling it out without the use of the principle of the lever. This, accordingly facilitates the work of detaching the cover. Because the insertion opening allowing the pressing member to be inserted therein is disposed in the bottom surface of the cover, the aesthetic appearance is not impaired. Even if the pressing member is unintentionally pushed inside more than necessary through the insertion opening, the spring hook functions as a protective wall, and the leading end of the pressing member can be prevented from being inserted deeply inside. Accordingly, disadvantages, such as breakage of components inside the remote controller, can be avoided.

DESCRIPTION OF EMBODIMENTS

Figure 1:
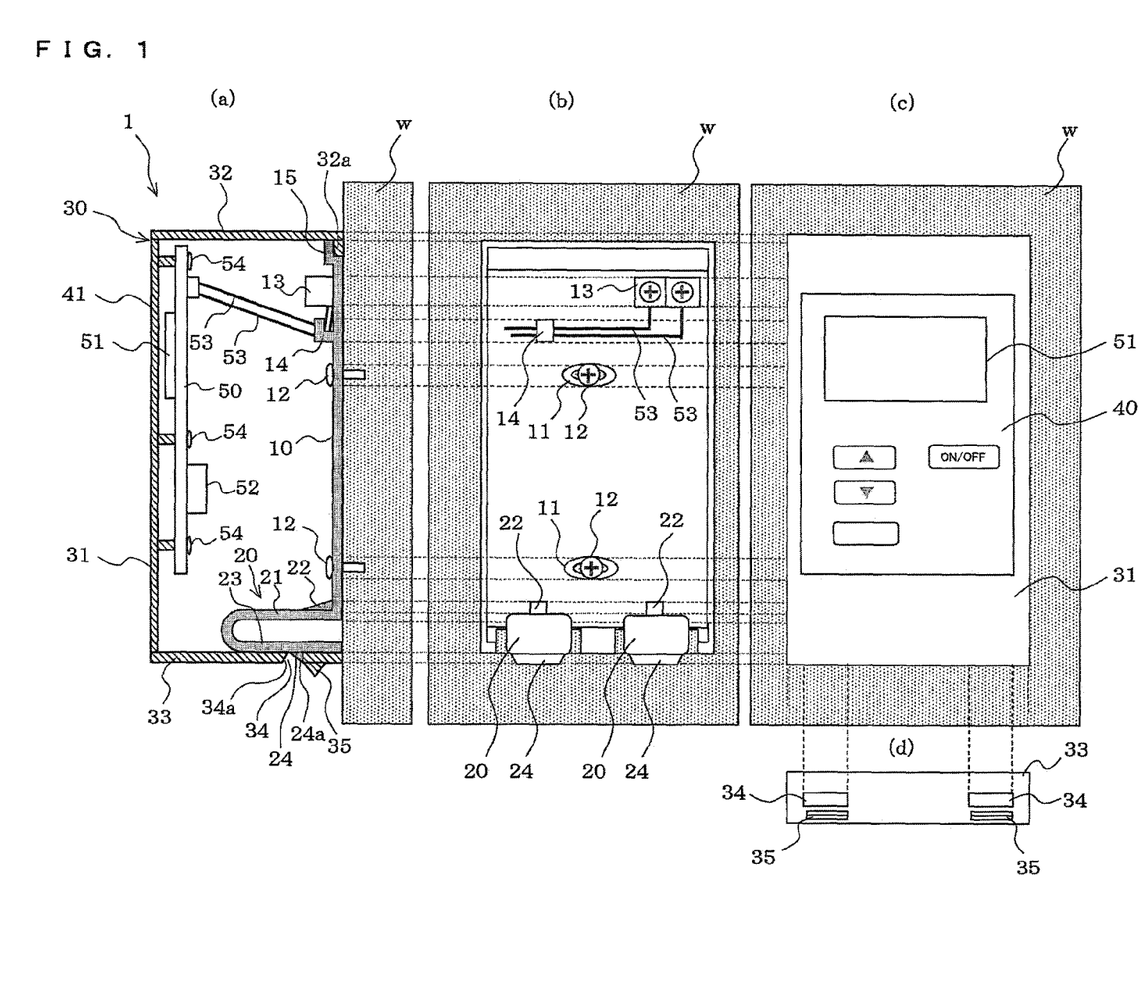
FIG. 1 includes views illustrating a wall-mount remote controller according to Embodiment of the present invention, (a) is a cross-sectional view seen from a side direction, (b) is a front view of a state where a cover is detached, (c) is a front view of a state where the cover is attached, and (d) is a bottom view of the cover.

FIG. 1 includes views illustrating a wall-mount remote controller according to Embodiment of the present invention, (a) is a cross-sectional view seen from a side direction, (b) is a front view of a state where a cover is detached, (c) is a front view of a state where the cover is attached, and (d) is a bottom view of the cover. In FIG. 1 and the other drawings described below, the same or equivalent elements are denoted by the same reference numerals, and this applies throughout the description. The forms of elements described throughout the description are merely illustrative and are not limited to the description herein. The terms "upper," "lower," "left," "right," "front," "rear," "near," and "far" used in the description below indicate directions when the wall-mount remote controller (hereinafter abbreviated as remote controller) is seen from the front. Any devices may be controlled by a remote controller 1. Here, an indoor unit in an air-conditioning apparatus is a device controlled by the remote controller 1.

The remote controller 1 includes a flat-shaped resin base 10 mountable on a wall W and a cover 30 releasably attached on the base 10 and fully covering the front surface of the base 10. The base 10 includes screw holes 11 in upper and lower, two places. The base 10 is screwed onto the wall W by screws 12 passing through the screw holes 11. A terminal stand 13 electrically connected to a power supply (not illustrated) is arranged on the upper portion of the base 10. A cord attachment 14 for fixing a power cord 53 described below is disposed below the terminal stand 13. The cord attachment 14 protrudes frontward from the front surface of the base 10. A retaining section 15 extending frontward and then extending upward is disposed on the upper end of the base 10.

Spring hooks 20 for use in detaching and attaching the cover are disposed in left and right two places in the lower front portion of the base 10. The spring hooks 20 are made of resin and formed integrally with the base 10.

Figure 2:
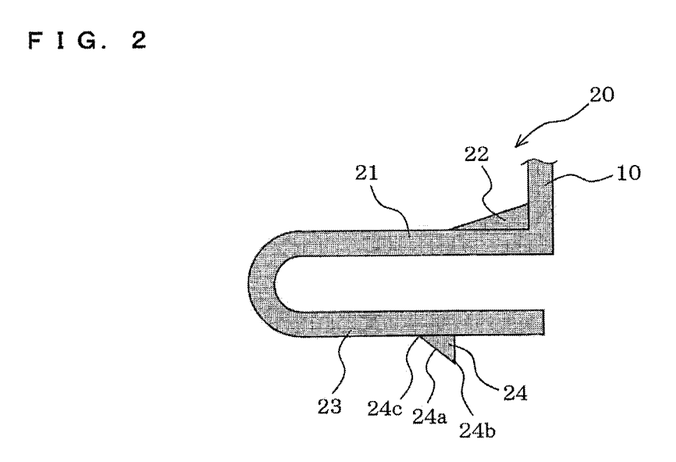
FIG. 2 is an enlarged view of a spring hook illustrated in FIG. 1.

FIG. 2 is an enlarged view of a spring hook illustrated in FIG. 1.

Each of the spring hooks 20 has a structure in which a support 21 extending frontward from the front surface of the base 10 and a hook section 23 extending downward from an end of the support 21 and then extending rearward are integral with each other. A reinforcing protrusion 22 reinforcing the support 21 and having a substantially right triangle seen from a side thereof is disposed on the central portion of the upper surface of the support 21 in the left and right direction (see FIG. 1(b)) at a substantially right-angled corner between the upper surface of the support 21 and the front surface of the base 10. The reinforcing protrusion 22 is integral with the support 21 and the base 10. A downwardly protruding hook protrusion 24 is disposed on the lower surface of the extending rear portion of the hook section 23. The hook protrusion 24 is integral with the hook section 23. The hook protrusion 24 includes a lower surface being an inclined surface 24a inclined downward toward the rear. The inclined surface 24a is a pressed surface pressed by a tool 60 (see FIG. 3) when the tool 60 is inserted through an insertion opening 34 described below.

Referring back to the description of FIG. 1, the cover 30 has a box shape that includes a front surface 31, an upper surface 32, a bottom surface 33, a right side surface (not illustrated), a left side surface (not illustrated), and an open rear. An operation section 40 including various operation buttons and a window 41 for enabling indications on a display device 51 on a circuit board 50 described below to be viewed are disposed on the front side of the front surface 31 of the cover 30. The circuit board 50, on which the display device 51 for displaying operational states and other states of an indoor unit operated by the remote controller 1 and a control circuit (not illustrated) are mounted, is screwed onto the back side of the front surface 31 of the cover 30 by screws 54.

The circuit board 50 is fixed to the front surface 31 such that the surface with the display device 51 mounted thereon faces the front surface 31. A DIP switch 52 for use in setting functions and the power cord 53 are disposed on the surface of the circuit board 50 opposite to the display device 51. The power cord 53 is retained by the cord attachment 14 on the base 10 and then connected to the terminal stand 13. A power is supplied to the circuit board 50 through the terminal stand 13 and the power cord 53.

The cover 30 includes an engagement section 32a extending downward on the rear end of the upper surface 32. The engagement section 32a is releasably retained on the retaining section 15 of the base 10 from the above. That is, the cover 30 is retained such that its upper portion is hung on the base 10. Retention of the lower portion of the cover 30 is described below.

The bottom surface 33 of the cover 30 has through holes 34 in two places corresponding to the two spring hooks 20. The through holes 34 are engageable with the hook protrusions 24 in the spring hooks 20 on the base 10. Each of the through holes 34 is a portion that also serves as an insertion opening into which the tool 60 as a pressing member is inserted in detaching the cover 30 from the base 10. Hereinafter, the insertion opening 34 is referred to as the insertion opening 34.

Here, the insertion opening 34 has a rectangular shape, as illustrated in FIG. 1(d). Among the four interior wall surfaces of the insertion opening 34, the front interior wall surface is an inclined guide surface 34a inclined upward toward the rear (toward the base 10). The inclined guide surface 34a functions as a guide in inserting the tool 60 through the insertion opening 34 and is disposed so as to enable a user in front of the remote controller 1 to readily insert the tool 60 in an obliquely upward direction. The direction of insertion of the tool 60 is not limited to the obliquely upward direction, and it may be an upward direction from directly below, for example.

A protrusion 35 serving as a mark for indicating the position of the insertion opening 34 to a user is disposed on the rear side of the insertion opening 34 on the bottom surface 33 of the cover 30. The protrusion 35 may preferably have a size visually identifiable by the user in front of the remote controller 1.

Next, operations occurring in detaching the cover 30 in the remote controller 1 having the above-described configuration are described.

Figure 3:
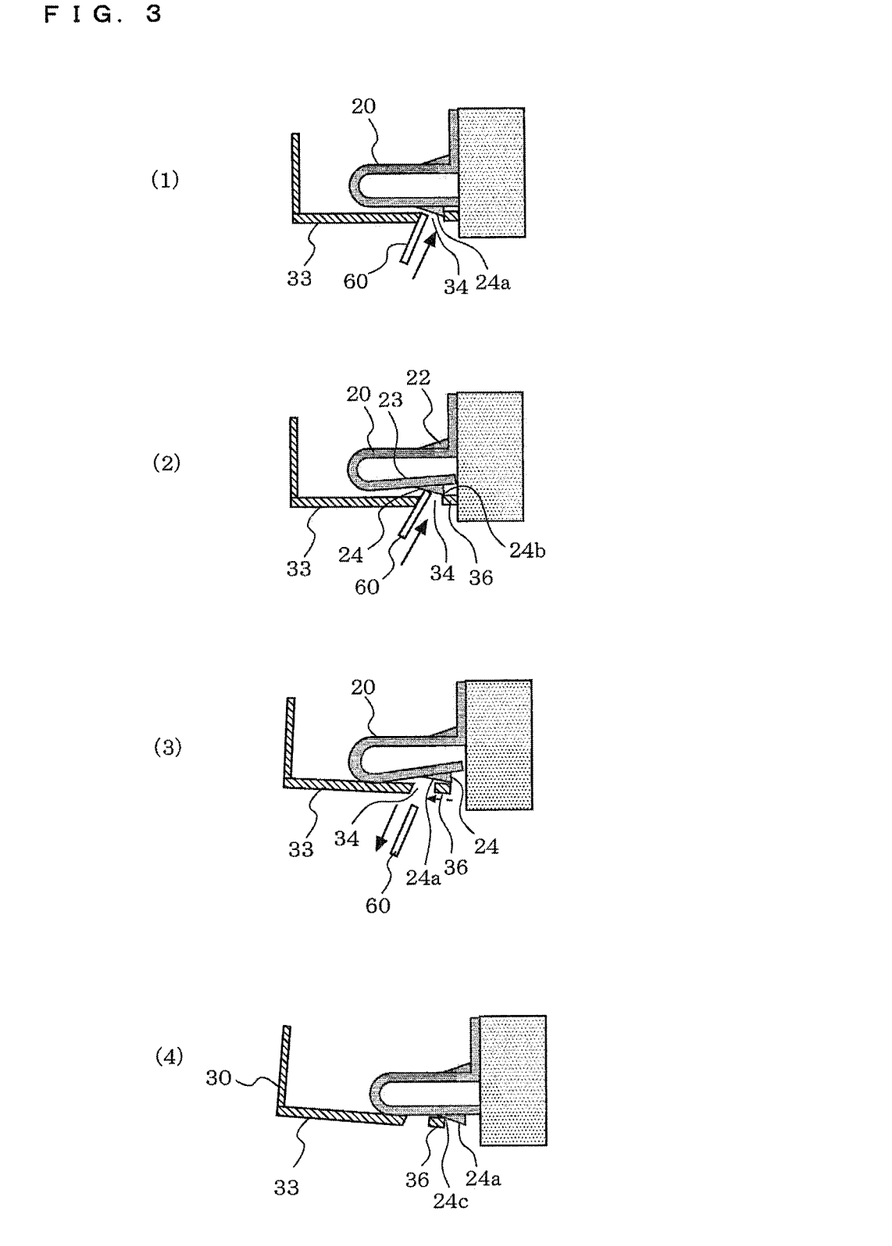
FIG. 3 includes views illustrating how the cover in the remote controller illustrated in FIG. 1 is detached.
Figure 4:
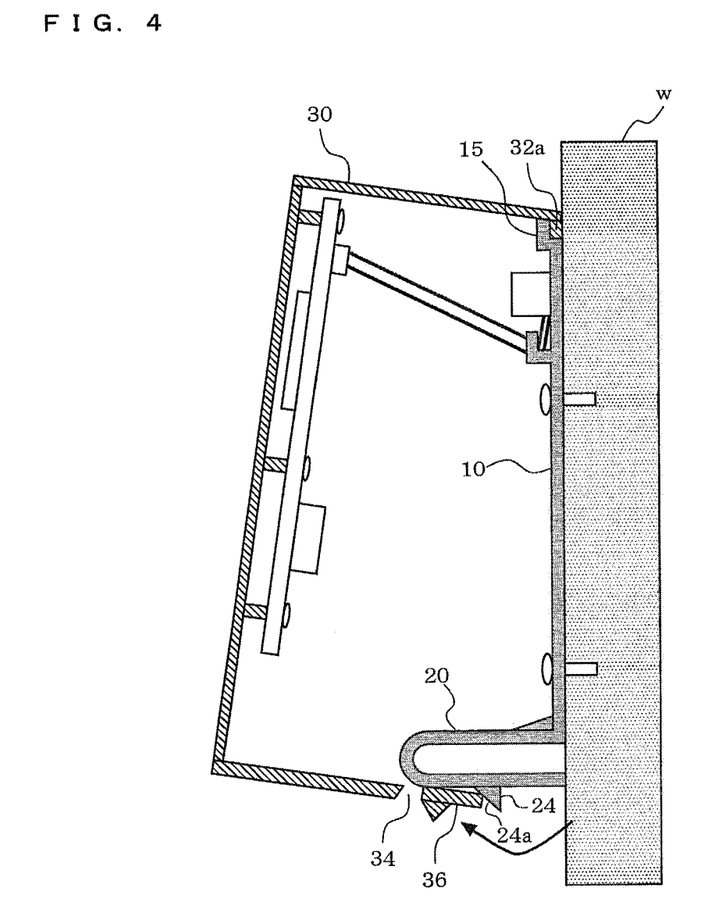
FIG. 4 is a cross-sectional view that illustrates a state where the spring hook in the remote controller illustrated in FIG. 1 is disengaged.

FIG. 3 includes views illustrating how the cover in the remote controller illustrated in FIG. 1 is detached, and the views are cross-sectional in which a main part including the spring hook is enlarged. FIG. 4 is a cross-sectional view that illustrates a state where the spring hook in the remote controller illustrated in FIG. 1 is disengaged. In FIG. 3, the solid-line arrows indicate the directions in which the tool 60 moves.

(1) First, a user identifies the position of the insertion opening 34 using the protrusion 35 on the bottom surface 33 of the cover 30 as a mark, inserts the tool 60 into the insertion opening 34, and presses the inclined surface 24a of the spring hook 20. At this time, the user inserts the tool 60 in an obliquely upward direction along the inclined guide surface 34a of the insertion opening 34.

(2) When the leading end of the tool 60 inserted into the insertion opening 34 is pressed in the obliquely upward direction along the inclined surface 24a of the spring hook 20, the hook section 23 of the spring hook 20 is bent and raised upward. With this movement, engagement between the hook protrusion 24 and the insertion opening 34 is released, and a lower end 24b of the hook protrusion 24 rides on a rear portion 36 on the rear side of the insertion opening 34 in the bottom surface 33 of the cover 30.

(3) Then, when the tool 60 is pulled out of the insertion opening 34, the spring hook 20 returns to its natural state by its own elastic force, and the returning force presses the rear portion 36 toward the front. Because the inclined surface 24a of the hook protrusion 24 in contact with the rear portion 36 is inclined upward toward the near side, the frontward pressing force by the spring hook 20 causes the rear portion 36 to slide on the inclined surface 24a in the direction of the broken line arrow and automatically move toward the near side.

(4) Then, the rear portion 36 in the bottom surface 33 of the cover 30 slides on the inclined surface 24a toward the near side, and thus the cover 30 further automatically rotates about the engagement portion between the engagement section 32a in the upper portion of the cover 30 and the retaining section 15 serving as a fulcrum illustrated in FIG. 4 toward the near side as indicated by the arrow in FIG. 4. In a state where the spring hook 20 returns to its natural state, the rear portion 36 in the bottom surface 33 is on the near side with respect to an uppermost end 24c of the inclined surface 24a of the hook protrusion 24, and the spring hook 20 is fully separated from the insertion opening 34.

The above-described operation of disengaging the spring hook 20 is performed on each of the two spring hooks 20, and the cover 30 is detached.

Here, in a state where the rear portion 36 in the bottom surface 33 of the cover 30 is on the near side with respect to the uppermost end 24c of the inclined surface 24a of the hook protrusion 24 (state illustrated in FIG. 3(4)), unless the bottom surface 33 of the cover 30 is pushed rearward so that the rear portion 36 is raised on the inclined surface 24a, the disengaged hook protrusion 24 is not retained in the insertion opening 34 again. Accordingly, in the course of disengaging the hook protrusion 24 on one spring hook 20, an earlier disengaged hook protrusion 24 on another spring hook 20 is not retained again.

In a state where both the two spring hooks 20 are disengaged from the respective insertion openings 34, because the engagement section 32a of the cover 30 is retained in a state where it is hung on the retaining section 15 of the base 10, the disadvantages of causing the cover 30 to fall down and impairing the aesthetic appearance of the cover in the course of disengaging the spring hook 20 can be avoided.

When the inclined surface 24a of the hook protrusion 24 is pressed by the tool 60, the hook section 23 of the spring hook 20 is pressed upward and bent, and an upward force acts on the support 21 of the spring hook 20. However, because the support 21 is reinforced with the reinforcing protrusion 22, even if the tool 60 is strongly pressed against the spring hook 20 and a large upward force acts thereon, the spring hook 20 is not broken.

Even if the tool 60 is unintentionally pushed inside through the insertion opening 34 strongly more than necessary, the spring hook 20 functions as a protective wall, and thus the leading end of the tool can be prevented from being inserted deeply inside. Accordingly, disadvantages, such as breakage of components inside the remote controller 1 by the tool 60, can be avoided.

Because of the structure in which the circuit board 50 is fixed to not the base 10 but the cover 30, even if the tool 60 is unintentionally inserted through the insertion opening 34 strongly more than necessary, breakage of the circuit board 50 can be prevented.

As described above, according to Embodiment, by inserting the tool 60 through the insertion opening 34 in the bottom surface 33 of the cover 30, pressing the tool 60 against the hook protrusion 24 on the spring hook 20 positioned inside the insertion opening 34, and then pulling the tool 60 out of the insertion opening 34, the lower portion of the cover 30 can be automatically opened and separated from the base 10 by an elastic force occurring when the spring hook 20 returns to its natural state. Thus, unlike known techniques, the cover 30 can be detached by inserting and pulling the tool 60 without using the principle of the lever. Accordingly, the work of detaching the cover 30 is fairly simple, and the detaching workability can be improved.

According to the remote controller 1 of Embodiment, because of improved workability in detaching the cover 30, the remote controller 1 is especially effective in cases where many remote controllers are mounted on walls, such as in hotel rooms. For example, to see the function settings of the remote controllers 1 and change the settings to change the air-conditioning operations (e.g., change a display method, set restriction or energy-saving mode), it is necessary to detach the covers 30 and see and change the settings of the DIP switches 52 inside. At this time, taking much time to detach the covers imposes a great deal of inconvenience on managing the rooms. In contrast, it is easy to detach the cover in the remote controller 1 of Embodiment, the time required for the work can be reduced, and thus the remote controller 1 is effective.

The insertion opening 34 disposed in the bottom surface 33 of the cover 30 does not impair the aesthetic appearance.

For known structures, which employ a detaching method using the principle of the lever, the portion acting as the fulcrum may be gradually dented. In contrast, for the structure of Embodiment, which uses linear movement inside the insertion opening 34, the disadvantage, such as a dent of the portion of the insertion opening 34 into which the tool 60 is inserted, can be prevented.

In Embodiment, the configuration having all the characteristic structures summarized in (a) to (g) below is described. However, the present invention is not limited to the configuration having all the structures. It is essential only that the configuration have at least (a) below.

(a) The structure includes the base 10 including the spring hook 20 and the cover 30 releasably attached to the base 10, having a box shape with an open rear, and covering the front surface of the base 10. The cover 30 includes the bottom surface 33 having the insertion opening 34 therethrough so as not to impair the aesthetic appearance. The insertion opening 34 allows a pressing member, such as the tool 60, to be inserted therethrough in detaching the cover 30 from the base 10. The spring hook 20 includes the support 21 extending frontward from the front surface of the base 10 and the hook section 23 extending downward from the end of the support 21 and then extending rearward. The hook protrusion 24 is disposed on the lower surface of the extending rear portion of the hook section 23. The hook protrusion 24 is engageable with the insertion opening 34 of the cover 30. The hook protrusion 24 is disengageable from the insertion opening 34 by upward bending of the hook section 23 caused by pressing of the hook protrusion 24 from outside the cover 30 through the insertion opening 34.

(b) The structure is one in which the retaining section 15 is disposed on the upper front portion of the base 10. The cover 30 includes the engagement section 32a disposed on the rear end of the upper surface thereof. The engagement section 32a is retained on the retaining section 15 of the base 10 from above. After the hook protrusion 24 is disengaged from the insertion opening 34, the cover 30 is rotated frontward about the engagement section 32a serving as a fulcrum by an elastic force occurring when the spring hook 20 returns to its natural state.

(c) The structure is one in which the lower surface of the hook protrusion 24 on the spring hook 20 is the inclined surface 24a inclined downward toward the rear.

(d) The structure is one in which the circuit board 50 is fixed to the cover 30.

(e) The structure is one in which the protrusion serving as a mark for the insertion opening 34 is disposed on the bottom surface 33.

(f) The structure is one in which the front interior wall surface of the insertion opening 34 is the inclined guide surface 34a inclined upward toward the rear (toward the base 10).

(g) The structure is one in which the support 21 of the spring hook 20 is reinforced by the reinforcing protrusion 22.

Figure 5:
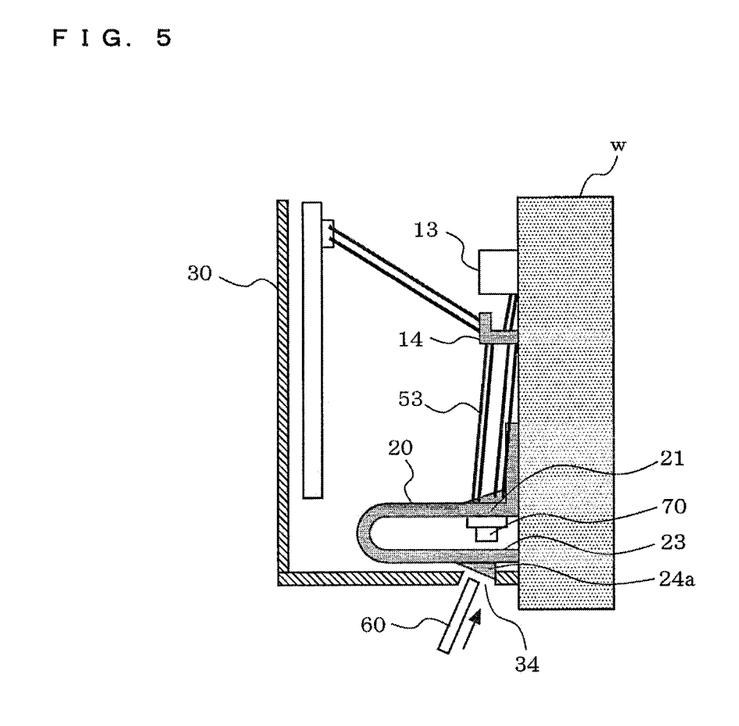
FIG. 5 illustrates an example application of the spring hook.

An example application for the spring hook 20 is illustrated in FIG. 5 described below.

FIG. 5 illustrates an example application of the spring hook.

In FIG. 5, a power off switch 70 is disposed on the bottom surface of the support 21 in the spring hook 20. The power off switch 70 is connected to the power cord 53. The supply of power to the circuit board 50 may be turned off by pressing of the power off switch 70 caused by pressing and raising the hook section 23 upward. The power off switch 70 may serve as a power feed off request switch. When the power feed off request switch is pressed, a power feed request off signal may be provided to an indoor unit that is supplying power, and the feeding of the power from the indoor unit may be stopped.

In the foregoing description, the spring hook 20 is made of resin, and the spring hook 20 is formed integrally with the base 10. The material and method of forming them are not limited to those described above.

REFERENCE SIGNS LIST 1 wall-mount remote controller 10 base 11 screw hole 12 screw 13 terminal stand 14 cord attachment 15 retaining section 20 spring hook 21 support 22 reinforcing protrusion 23 hook section 24 hook protrusion 24a inclined surface 24b lower end 24c uppermost end 30 cover 31 front surface 32 upper surface 32a engagement section 33 bottom surface 34 insertion opening (through hole) 34a inclined guide surface 35 protrusion 36 rear portion 40 operation section 41 window 50 circuit board 51 display device 52 DIP switch 53 power cord 54 screw 60 tool 70 power off switch W wall

The invention claimed is:

1. A wall-mount remote controller comprising:
a base fixable to a wall; and
a cover releasably attached to the base, having a box shape with an open rear, and covering a front surface of the base,
wherein the cover includes a bottom surface having an insertion opening therethrough, the insertion opening allows a pressing member to be inserted therein in detaching the cover from the base,
wherein, in a lower front portion of the base, a spring hook is disposed, the spring hook including a support extending frontward from the front surface of the base and a hook section extending downward from an end of the support and then extending rearward, a hook protrusion is disposed on a lower surface of an extending rear portion of the hook section, the hook protrusion is engageable with the insertion opening of the cover, and
the hook protrusion is disengageable from the insertion opening by upward bending of the hook section caused by pressing of the hook protrusion by the pressing member inserted through the insertion opening.

2. The wall-mount remote controller of claim 1, wherein a retaining section is disposed on an upper front portion of the base, the cover includes an engagement section on a rear end of an upper surface thereof, the engagement section is retained on the retaining section of the base from above, and after the hook protrusion is disengaged from the insertion opening, the cover is rotated frontward about an engagement portion as a fulcrum by an elastic force occurring when the spring hook returns to its natural state, the engagement portion being a portion between the engagement section and the retaining section.

3. The wall-mount remote controller of claim 1, wherein the hook protrusion on the spring hook includes a lower surface being an inclined surface that is inclined downward toward a rear.

4. The wall-mount remote controller of claim 1, wherein a circuit board relating to operations of and displaying of the remote controller is fixed to a back side of a front surface of the cover.

5. The wall-mount remote controller of claim 1, wherein a protrusion serving as a mark for indicating a position of the insertion opening is disposed on a rear side of the insertion opening on the bottom surface of the cover.

6. The wall-mount remote controller of claim 1, wherein the insertion opening of the cover includes a front interior wall surface being an inclined guide surface inclined upward toward the rear.

7. The wall-mount remote controller of claim 1, wherein a reinforcing protrusion is disposed at a corner between an upper surface of the support of the spring hook and the front surface of the base.

8. The wall-mount remote controller of claim 1, wherein a power off switch is disposed on the spring hook, and the power off switch is configured to stop supply of power to the wall-mount remote controller by being depressed when the hook section of the spring hook is pressed.

* * * * *